(12) United States Patent
Chu et al.

(10) Patent No.: US 9,900,246 B2
(45) Date of Patent: Feb. 20, 2018

(54) SYSTEM AND METHOD FOR LOOP SUPPRESSION IN TRANSIT NETWORKS

(71) Applicant: Huawei Technologies Co., Ltd., Shenzhen (CN)

(72) Inventors: Xingjun Chu, Ottawa (CA); Peter Ashwood-Smith, Gatineau (CA); Yapeng Wu, Nepean (CA); Guoli Yin, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 99 days.

(21) Appl. No.: 15/147,612

(22) Filed: May 5, 2016

(65) Prior Publication Data

US 2016/0248666 A1 Aug. 25, 2016

Related U.S. Application Data

(62) Division of application No. 14/274,410, filed on May 9, 2014, now Pat. No. 9,350,648.

(51) Int. Cl.
*H04L 12/723* (2013.01)
*H04L 12/705* (2013.01)
(Continued)

(52) U.S. Cl.
CPC .......... *H04L 45/50* (2013.01); *H04L 12/4633* (2013.01); *H04L 45/122* (2013.01);
(Continued)

(58) Field of Classification Search
CPC ..... H04L 12/28; H04L 12/705; H04L 12/723; H04L 12/733; H04L 12/931;
(Continued)

(56) References Cited

U.S. PATENT DOCUMENTS

| 6,728,220 B2 * | 4/2004 | Behzadi | H04L 45/02 370/254 |
| 6,879,594 B1 * | 4/2005 | Lee | H04L 12/185 370/389 |

(Continued)

FOREIGN PATENT DOCUMENTS

CN 101322355 A 12/2008

OTHER PUBLICATIONS

IEEE 803.1aq, from Wikipedia, the free encyclopedia (Redirected from 802.1aq), http://wikipedia.org/wiki/802.1aq, printed on Sep. 17, 2014, 11 pages.

(Continued)

*Primary Examiner* — Tri H Phan
(74) *Attorney, Agent, or Firm* — Slater Matsil, LLP

(57) ABSTRACT

An embodiment method of loop suppression in a layer-two transit network with multiprotocol label switching (MPLS) encapsulation includes receiving a packet at a provider edge (PE) router for the layer-two transit network. The packet is stored in a non-transitory memory on the PE router. The packet is stored according to a packet data structure having an MPLS label field and a layer-two header. A time-to-live (TTL) attribute is then determined for the packet. The TTL attribute is written to the non-transitory memory in the MPLS label field. The packet is then routed according to information in the layer-two header.

20 Claims, 6 Drawing Sheets

(51) Int. Cl.
*H04L 12/733* (2013.01)
*H04L 12/931* (2013.01)
*H04L 12/46* (2006.01)

(52) U.S. Cl.
CPC .............. *H04L 45/18* (2013.01); *H04L 45/20* (2013.01); *H04L 49/354* (2013.01)

(58) Field of Classification Search
CPC ..... H04L 12/4633; H04L 45/18; H04L 45/20; H04L 45/50; H04L 45/122; H04L 49/354
See application file for complete search history.

(56) References Cited

U.S. PATENT DOCUMENTS

| | | | |
|---|---|---|---|
| 7,227,867 B1 | 6/2007 | Ferguson et al. | |
| 7,664,013 B2* | 2/2010 | Filsfils | H04L 45/04 370/218 |
| 7,869,345 B2* | 1/2011 | Scudder | H04L 45/02 370/217 |
| 7,937,492 B1 | 5/2011 | Kompella et al. | |
| 8,644,186 B1* | 2/2014 | Boers | H04L 45/18 370/254 |
| 8,755,383 B2 | 6/2014 | Keesara | |
| 8,767,730 B2 | 7/2014 | Ashwood-Smith | |
| 2002/0176370 A1* | 11/2002 | Ohba | H04L 1/0001 370/252 |
| 2006/0221813 A1 | 10/2006 | Scudder et al. | |
| 2008/0056265 A1* | 3/2008 | Choi | H04L 45/00 370/392 |
| 2008/0159277 A1 | 7/2008 | Vobbilisetty et al. | |
| 2009/0161567 A1* | 6/2009 | Jayawardena | H04L 43/0847 370/252 |
| 2010/0189118 A1 | 7/2010 | Nonaka | |
| 2010/0238788 A1 | 9/2010 | Boutros et al. | |
| 2010/0238812 A1 | 9/2010 | Boutros et al. | |
| 2012/0224579 A1 | 9/2012 | Ashwood-Smith | |
| 2013/0148660 A1 | 6/2013 | Ashwood-Smith et al. | |
| 2013/0208718 A1 | 8/2013 | Ashwood-Smith | |
| 2013/0322436 A1* | 12/2013 | Wijnands | H04L 45/20 370/389 |
| 2014/0211794 A1 | 7/2014 | Frost et al. | |

OTHER PUBLICATIONS

IEEE P802.1Qbp/D1.7: Draft Standard for Local and Metropolitan Area Networks—Virtual Bridged Local Area Networks—Amendment: Equal Cost Multiple Paths (ECMP), Sponsored by LAN/MAN Standards Committee of the IEEE Computer Society, Prepared by the Interworking Task Group of IEEE 802.1, Sep. 11, 2013, 123 pages.

IEEE Std 802.1aq-2012: IEEE Standard for Local and metropolitan area networks—Media Access Control (MAC) Bridges and Virtual Bridged Local Area Networks—Amendment 20: Shortest Path Bridging, IEEE Computer Society, Sponsored by the LAN/MAN Standards Committee, Jun. 29, 2012, 340 pages.

IEEE Std 802.1D-2004: 802.1D IEEE Standard for Local and metropolitan area networks, Media Access Contro. (MAC) Bridges, IEEE Computer Society, Sponsored by teh LAN/MAN Standard Committee, Jun. 9, 2004, 281 pages.

IEEE Std 802.1Q-2005: IEEE Standard for Local and metropolitan area networks, Virtual Bridged Local Area Networks, IEEE Computer Society, Sponsored by the LAN/MAN Standards Committee, May 19, 2006, 303 pages.

IEEE Std 802.1Q2011/Cor 2-2012: IEEE Standard for Local and metropolitan area networks—Media Access Control (MAC) Bridges and Virtual Bridged Local Area Networks—Corrigendum 2: Technical and editorial corrections, IEEE Computer Society, Sponsored by the LAN/MAN Standards Committee, Nov. 2, 2012, 96 pages.

RFC3031_4504410 Multiprotocol Label Switching Architecture, E. Rosen, et al., Standards Track, Jan. 2001, 55 pages.

RFC791_4504416 Internet Protocol, Darpa Internet Program Protocol Specification, Information Sciences Institute, Sep. 1981, 46 pages.

RFC793_4504414 Transmission Control Protocol, Darpa Internet Program Protocol Specification, Information Sciences Institute, Sep. 1981, 84 pages.

Spanning Tree Protocol, from Wikipedia, the free encyclopedia, http://en.wikipedia.org/wiki/Spanning_Tree_Protocol, printed on Sep. 17, 2014, 6 pages.

* cited by examiner

SYSTEM AND METHOD FOR LOOP SUPPRESSION IN TRANSIT NETWORKS

This patent application is a divisional of U.S. patent application Ser. No. 14/274,410 filed on May 9, 2014 titled "System and Method for Loop Suppression in Transit Networks," which is incorporated herein by reference in its entirety.

TECHNICAL FIELD

The present invention relates generally to loop suppression in transit networks and, in particular embodiments, to a system and method for loop suppression in a layer-two transit network with multiprotocol label switching (MPLS) encapsulation.

BACKGROUND

The Open Systems Interconnection (OSI) model partitions communication systems into abstraction layers. A given layer serves layers above, and is served by layers below. For example, a first layer serves a second layer, and the second layer serves a third. The first layer is a physical layer that defines physical specifications for a data connection. Physical specifications include connector layouts, cable specifications, and hardware specifications, among others. The second layer is a data link layer that provides a reliable link between two directly connected nodes. For example, Ethernet is a layer-two protocol that utilizes the physical layer to provide an Ethernet link between two nodes. The third layer is a network layer that provides procedures and functionality to define a network over which data sequences, i.e., datagrams, are transmitted among various nodes in the network. For example, internet protocol (IP) is a layer-three protocol that provides many capabilities, including routing functionality and IP addresses, among others.

One capability introduced in layer-three networks is loop suppression. IP introduces a time-to-live (TTL) attribute in an IP header that encapsulates a given packet. The TTL attribute can be used as an indicator of a loop's existence in a network. The general idea is that a packet should be discarded, or dropped, by the network after a certain number of hops to prevent infinite unicast or multicast loops.

SUMMARY OF THE INVENTION

Embodiments of the present invention provide a system and method for loop suppression in transit networks.

An embodiment method of loop suppression in a layer-two transit network with multiprotocol label switching (MPLS) encapsulation includes receiving a packet at a provider edge (PE) router for the layer-two transit network. The packet is stored in a non-transitory memory on the PE router. The packet is stored according to a packet data structure having an MPLS label field and a layer-two header. A time-to-live (TTL) attribute is then determined for the packet. The TTL attribute is written to the non-transitory memory in the MPLS label field. The packet is then routed according to information in the layer-two header.

An embodiment method of Ethernet packet routing in a layer-two transit network with MPLS encapsulation includes receiving a packet at a provider router for the layer-two transit network. The packet has an MPLS label field and a layer-two header. The packet is stored in a non-transitory memory on the provider router. The provider router evaluates a TTL attribute stored in the MPLS label field for loop detection. When the TTL attribute indicates a loop, the packet is dropped. When the TTL attribute does not indicate a loop, the TTL attribute is recalculated and written to the non-transitory memory. The packet is then routed according to information in the layer-two header.

An embodiment PE router includes a network interface controller (NIC), a non-transitory memory, and a processor. The NIC is couplable to a transit network. The non-transitory memory is configured to store an MPLS encapsulated packet having an MPLS label field and a layer-two header. The processor is coupled to the non-transitory memory and the NIC. The processor is configured to compute a starting TTL value for the MPLS encapsulated packet. The processor is also configured to cause the starting TTL value to be written to the MPLS label field in the non-transitory memory. The processor is further configured to instruct the NIC to transmit the MPLS encapsulated packet according to information in the layer-two header.

An embodiment provider router includes a NIC, a non-transitory memory, and a processor. The NIC has a first port and a second port, both couplable to a transit network. The non-transitory memory is configured to store an MPLS encapsulated packet. The MPLS encapsulated packet is receivable through the first port and includes an MPLS label field a layer-two header. The processor is coupled to the NIC and the non-transitory memory. The processor is configured to evaluate a TTL attribute stored in a memory block of the non-transitory memory corresponding to the MPLS label field for loop detection. When the TTL attribute in the non-transitory memory indicates a loop, the MPLS encapsulated packet is dropped. When the TTL attribute does not indicate a loop, a new TTL value is computed and written to the memory block corresponding to the MPLS label field. The processor then causes the NIC to transmit the MPLS encapsulated packet through the second port according to information in the layer-two header.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
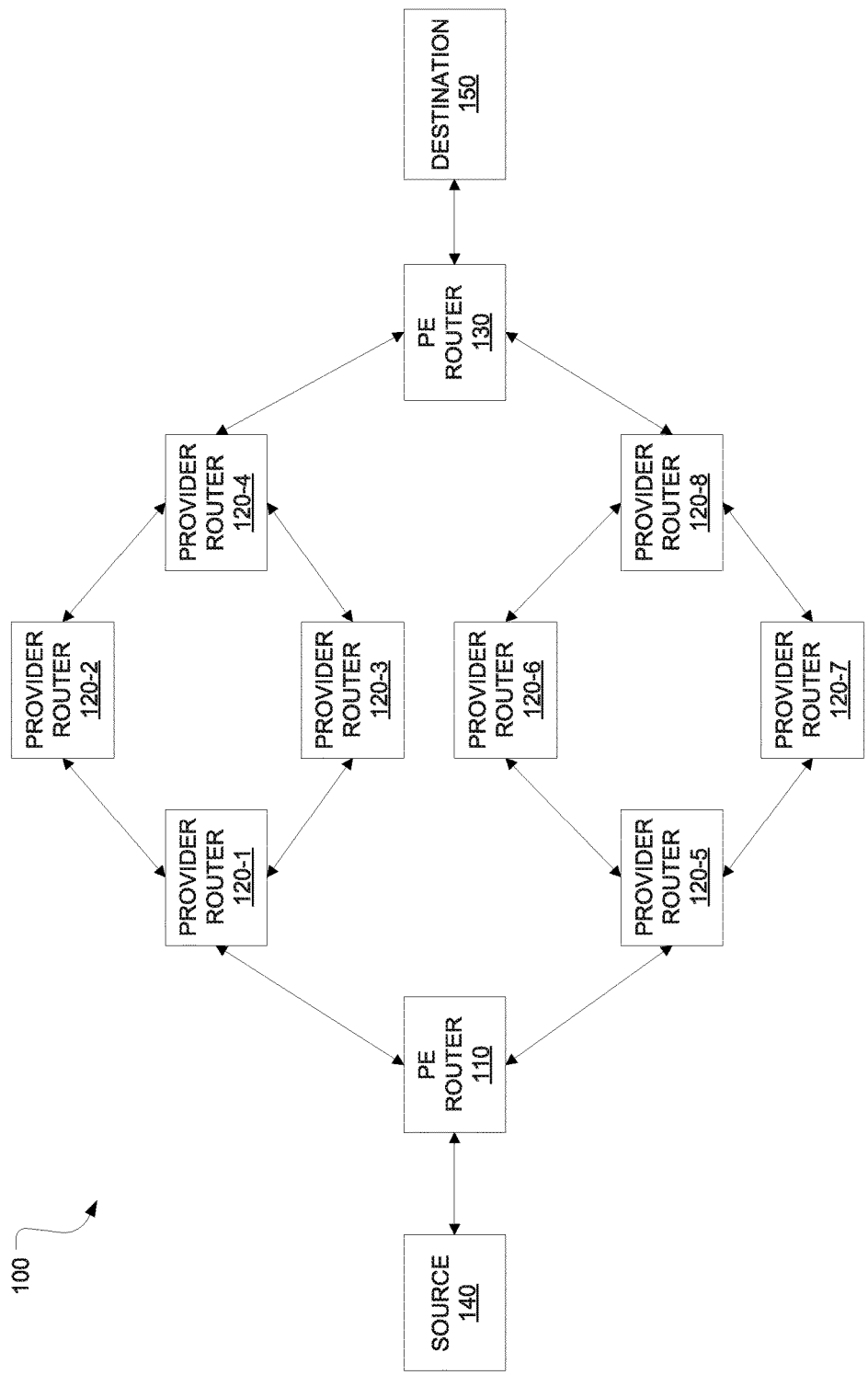
FIG. 1 is a block diagram of a transit network.

The making and using of embodiments are discussed in detail below. It should be appreciated, however, that the present invention provides many applicable inventive concepts that may be embodied in a wide variety of specific contexts. The specific embodiments discussed are merely illustrative of specific ways to make and use the invention, and do not limit the scope of the invention.

Multiprotocol label switching (MPLS) is an encapsulation technique that provides additional Ethernet packet routing capabilities beyond Ethernet routing. Ethernet routing utilizes data in a layer-two header, i.e., an Ethernet header, to route a packet from node to node. MPLS applies a label to the packet, e.g., a transit label or a service label, effectively encapsulating the packet. In certain embodiments, MPLS encapsulation uses a service label only, while, in other embodiments. MPLS encapsulation uses both a transit label and a service label. Hardware in a layer-three network typically includes an MPLS control plane to facilitate packet forwarding according to the MPLS labels and data in the layer-three header, i.e., the IP header. The transit label identifies a particular transit network as a destination for the packet. The transit network bridges two other networks, which can include one or more service networks. The service label identifies a service network as a destination for the packet. A service network is a network of linked devices, such as a virtual private network (VPN) or a virtual private local area network (VLAN), among others. Hardware in a layer-two network generally lacks the MPLS control plane and therefore relies on Ethernet routing for packet forwarding. Some layer-two networks incorporate MPLS encapsulation, but without the MPLS packet forwarding, and route without a layer-three header. These are sometimes referred to as layer-two-and-a-half networks.

It is realized herein that loop suppression can be achieved in a layer-two network without a need for additional hardware or packet headers. In a layer-two transit network using MPLS encapsulation, packet forwarding is carried out according to data in the layer-two header, which can include a backbone media access control address (BMAC), a destination address (DA) and a virtual local area network identifier (VID). It is realized herein that a TTL attribute can be included in an MPLS label field of a MPLS encapsulated packet. The TTL attribute can be included in either a transit label field or a service label field, which depends at least partially on whether a given embodiment uses an MPLS transit label, an MPLS service label, or both. The MPLS label field is generally a 32-bit field having a 20-bit MPLS label portion, a 3-bit quality of service (QoS) portion, a 1-bit stack indicator portion, and a remaining 8 bits that can be used for the TTL attribute. In alternative embodiments, the size of the MPLS label field and the allocation of bits to the various portions can vary per implementation. For example, the TTL attribute can be allocated 7 bits, 6 bits, 5 bits, etc. In other embodiments, the TTL attribute can be allocated more bits. For example, certain embodiments of the MPLS label can include 9 bits, 10 bits, 11 bits, 12 bits, etc. for the TTL attribute. Additionally, alternative embodiments can include fewer or additional portions.

By utilizing MPLS encapsulation and packing the TTL attribute in the MPLS label field, embodiment transit networks can achieve loop suppression without additional hardware to handle additional labels and without the MPLS control plane for routing packets. Provider routers can carry out packet forwarding via software configured to forward packets based on the layer-two header. It is further realized herein that packing the TTL attribute in the MPLS label field avoids utilizing other fields in the packet, which generally reduces capability elsewhere in layer-two protocols.

It is also realized herein that provider routers within the transit network can extract the TTL attribute from the MPLS label field and determine whether a given packet should be forwarded or dropped. When a packet is not dropped, the provider routers can recompute the TTL attribute according to its value at arrival. The precise method of computing a new value for the TTL attribute can vary among implementations. In certain embodiments, each recalculation can include a linear function of the value at arrival. For example, a simple approach is to use a starting TTL value equal to the maximum number of hops allowed through a transit network. The starting value for the TTL attribute is computed by an ingress provider router, also referred to as a provider edge (PE) router or ingress PE router. As a packet moves from one hop to the next, the provider router at that hop decrements the TTL value by one and forwards the packet. Provider routers generally include hardware and software configured to count hops and to carry out packet routing. When the packet arrives at a provider router with a TTL attribute value of zero, the packet is dropped. Alternatively, when the packet reaches an egress provider router, also referred to as a PE router or an egress PE router, the TTL attribute is removed along with the MPLS label.

In alternative embodiments, it is realized herein, the function by which a new TTL attribute value is computed can be any linear function. Additionally, the starting and end values for the TTL attribute can be varied to suit a given linear function and transit network.

FIG. 1 is a block diagram of a transit network 100. Transit network 100 includes an ingress PE router 110, a core of provider routers 120-1 through 120-8, and an egress PE router 130. Ingress PE router 110 and egress PE router 130 are also provider routers, although they are specialized to carry out necessary functions at the edges of transit network 100. A packet, transmitted from a source 140, enters transit network 100 at ingress PE router 110. Ingress PE router 110 is configured to apply MPLS encapsulation to the packet. The MPLS label field for the packet is populated with a TTL attribute that is computed by ingress PE router 110. The starting value for the TTL attribute is related to the maximum number of hops necessary to traverse transit network 100, which is sometimes referred to as the diameter of the network. The packet is then forwarded to one of provider routers 120-1 through 120-8. Transit network 100 has a diameter of five, because a packet can be routed from source 140 to a destination 150 in five hops. The maximum number of hops allowed before dropping a packet can be adjusted for a given transit network. For example, in alternative embodiments, the maximum number of hops can be specified as the network diameter plus one. The additional margin can increase the robustness of the transit network without too much impact on network resources.

Provider routers 120-1 through 120-8 are configured to evaluate the TTL attribute in the MPLS label field of the packet. Provider routers 120-1 through 120-8 check whether the TTL attribute value has reached a threshold that indicates a loop exists. When the TTL attribute indicates a loop exists, the packet is dropped. Otherwise, the packet is forwarded according to information in the layer-two header. The TTL attribute value is recomputed before the packet is forwarded, and reevaluated at the next hop.

When the packet reaches egress PE router 130, the MPLS encapsulation is removed, by removing the MPLS label from the packet. The packet is then routed to destination 150.

Figure 2:
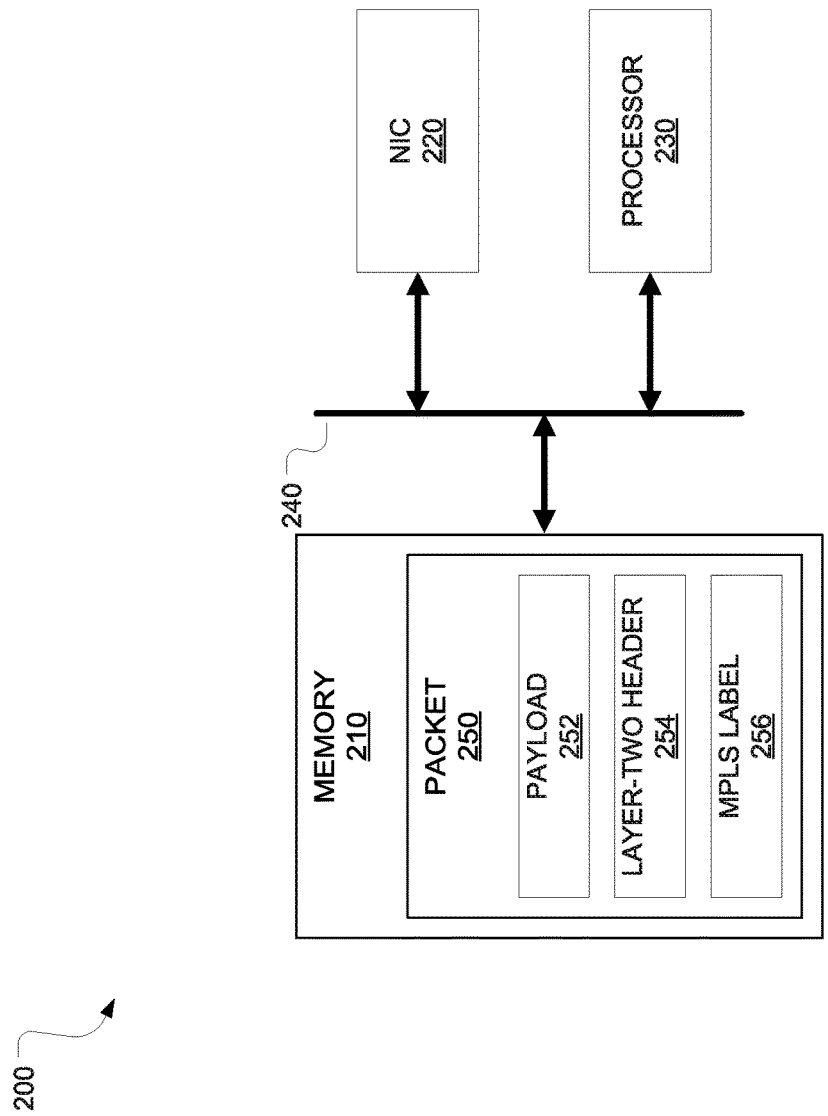
FIG. 2 is a block diagram of one embodiment of a provider router.

FIG. 2 is a block diagram of one embodiment of a provider router 200. In certain embodiments, provider router is part of a core of provider routers in a transit network. In alternative embodiments, provider router is a PE router. Provider router 200 includes a memory 210, a network interface controller (NIC) 220, and a processor 230. Memory 210, NIC 220, and processor 230 are coupled to a bus 240. Bus 240 facilitates the transfer of data and instructions among memory 210, NIC 220, and processor 230.

NIC 220 is a physical network interface that couples provider router 200 to a transit network. NIC 220 is configured to receive packets. Memory 210 is a non-transitory memory and is configured to store a packet data structure 250. Packet data structure 250 includes a payload portion 252, a layer-two header 254, and an MPLS label 256.

In embodiments where provider router 200 is a PE router, processor 230 is configured to apply MPLS encapsulation to a received packet stored in memory 210. The MPLS encapsulation adds an MPLS label to the packet, which is stored in MPLS label 256 in packet data structure 250. Processor 230 is further configured to determine a starting value for a TTL attribute. The starting value is written to MPLS label 256 in packet data structure 250. Processor 230 then instructs NIC 220 to route the packet according to information in layer-two header 254.

In embodiments where provider router 200 is part of the core of provider routers in the transit network, the packet received by NIC 220 is an MPLS encapsulated packet. Processor 230 is configured to extract the TTL attribute from MPLS label 256 in packet data structure 250. Processor 230 is further configured to evaluate the TTL attribute and determine whether the packet should be dropped. When the TTL attribute indicates a loop exists in the transit network, processor 230 causes the packet to be dropped. When the TTL attribute does not indicate a loop exists, processor 230 determines a new value for the TTL attribute. The new value can be computed according to a linear function of the arrival value of the TTL attribute. Processor 230 then instructs NIC 220 to forward the packet according to information in layer-two header 254.

Processor 230 can be implemented in one or more processors, one or more application specific integrated circuits (ASICs), one or more field-programmable gate arrays (FPGAs), dedicated logic circuitry, or any combination thereof, all collectively referred to as a processor. The functions for processor 230 can be stored as instructions in non-transitory memory for execution by processor 230.

Figure 3:
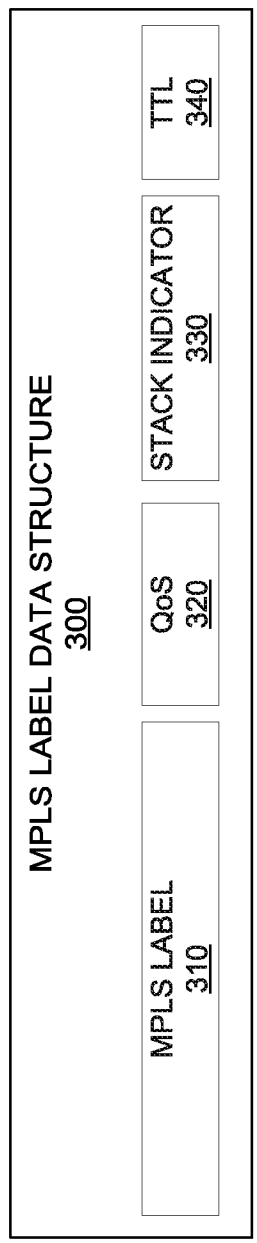
FIG. 3 is a block diagram of one embodiment of an MPLS label data structure.

FIG. 3 is a block diagram of one embodiment of an MPLS label data structure 300. MPLS label data structure 300 includes an MPLS label portion 310, a QoS portion 320, a stack indicator portion 330, and a TTL portion 340. In certain embodiments, the allocation of bits among the portions varies per implementation. For example, in an embodiment where MPLS label data structure 300 includes 32 bits, MPLS label portion 310 can be allocated 20 bits, QoS portion 320 can be allocated 3 bits, stack indicator 330 can be allocated 1 bit, and the remaining 8 bits can be allocated to TTL portion 340. In alternative embodiments, MPLS label data structure 300 can be allocated greater or fewer than 32 bits. In some embodiments, MPLS label data structure 300 can include additional portions among which the bits of MPLS label data structure 300 are allocated.

Figure 4:
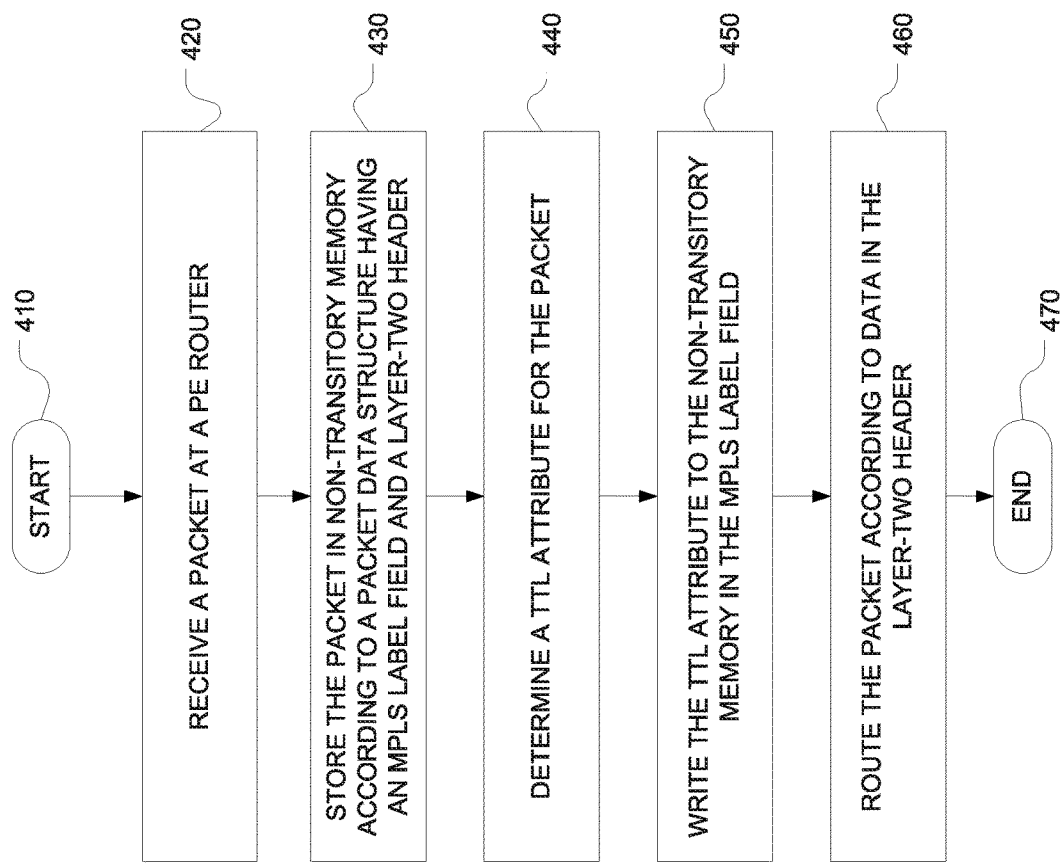
FIG. 4 is a flow diagram of one embodiment of a method of loop suppression in a layer-two transit network with MPLS encapsulation.

FIG. 4 is a flow diagram of one embodiment of a method of loop suppression in a layer-two transit network with MPLS encapsulation. The method begins at a start step 410. At a receive step 420, a packet is received at a PE router. The received packet is stored at a storing step 430. The packet is stored in a non-transitory memory according to a packet data structure. The packet data structure includes an MPLS label field and a layer-two header. In certain embodiments, the MPLS label field in the packet data structure is a service label field. In other embodiments, the MPLS label field is a transit label field. In some embodiments, the packet data structure includes both the service label field and the transit label field.

At a computation step 440, a TTL attribute is determined for the packet. The starting value for the TTL attribute is determined according to the maximum number of hops needed to traverse the layer-two transit network. The TTL attribute is written to the non-transitory memory at a storing step 450. The TTL attribute is stored in the MPLS label field of the packet data structure. The packet is then routed at a routing step 460. Packet routing is carried out according to information in the layer-two header. The method then ends at an end step 470.

Figure 5:
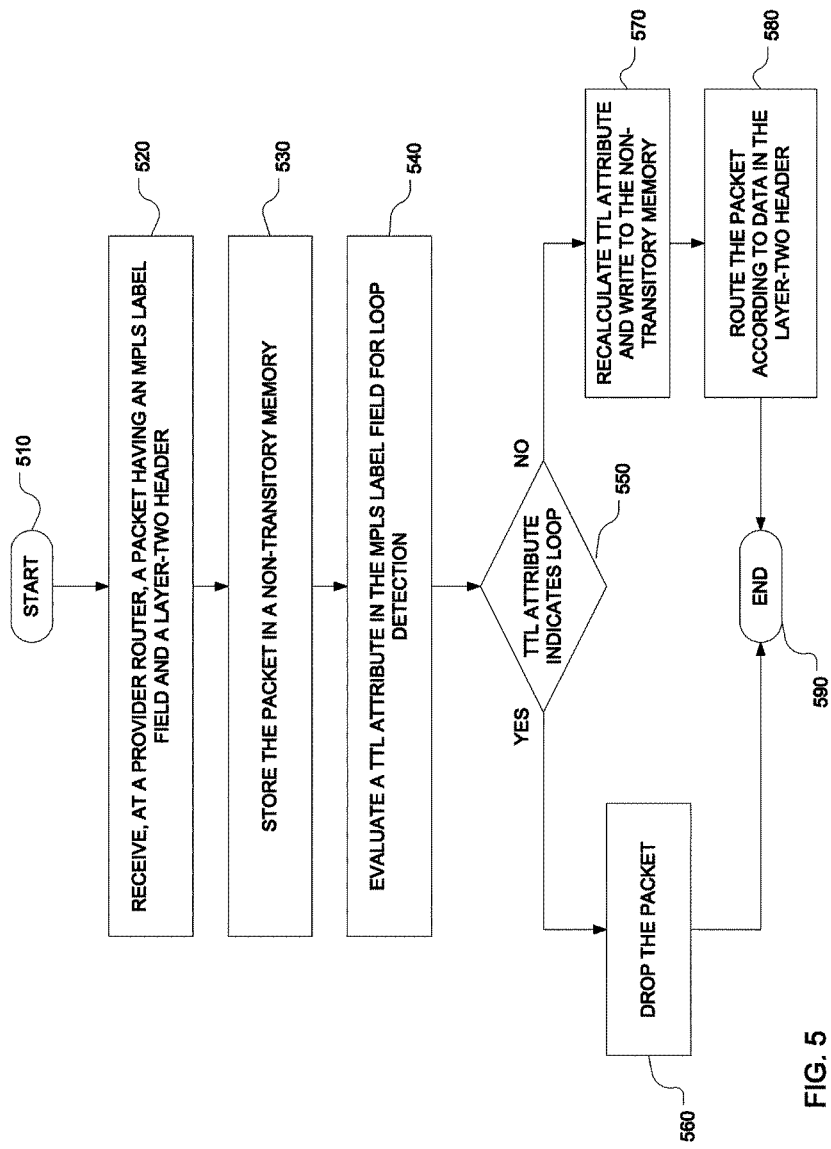
FIG. 5 is a flow diagram of one embodiment of a method of Ethernet packet routing in a layer-two transit network with MPLS encapsulation.

FIG. 5 is a flow diagram of one embodiment of a method of Ethernet packet routing in a layer-two transit network with MPLS encapsulation. The method begins at a start step 510. At a receive step 520, a packet is received at a provider router. The packet is MPLS encapsulated and includes an MPLS label field and a layer-two header. At a storing step 530, the packet is stored in a non-transitory memory. The packet can be stored according to a packet data structure.

At an evaluation step 540, a TTL attribute is extracted from the non-transitory memory and evaluated for loop detection. The TTL attribute is extracted from the MPLS label field of the packet. A determination is made at a check step 550 as to whether the TTL attribute indicates a loop exists in the layer-two transit network. If the TTL attribute indicates a loop, then the packet is dropped at a dropping step 560. Otherwise the method continues to a TTL recalculation step 570. At TTL recalculation step 570, a new value for the TTL attribute is computed and written to the non-transitory memory in the MPLS label field. The packet is then routed at a routing step 580. Packet routing is carried out according to information in t the layer-two header in the non-transitory memory. The method then ends at an end step 590.

Figure 6:
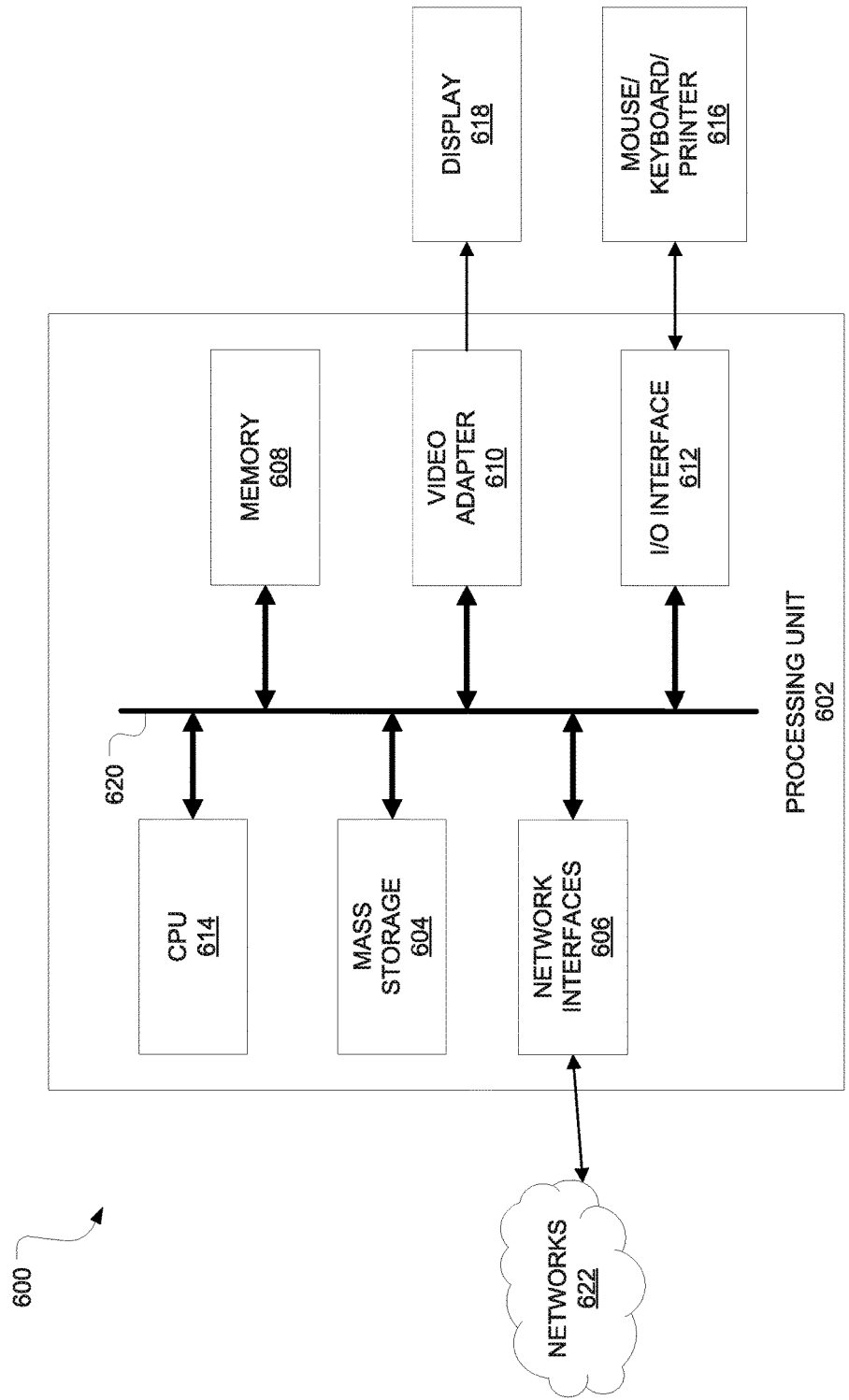
FIG. 6 is a block diagram of a computing system.

FIG. 6 is a block diagram of a computing system 600 that may be used for implementing the devices and methods disclosed herein. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 600 may comprise a processing unit 602 equipped with one or more input/output devices, such as a speaker, microphone, mouse, touchscreen, keypad, keyboard, printer, display, and the like. The processing unit may include a central processing unit (CPU) 614, memory 608, a mass storage device 604, a video adapter 610, and an I/O interface 612 connected to a bus 620.

The bus 620 may be one or more of any type of several bus architectures including a memory bus or memory controller, a peripheral bus, video bus, or the like. The CPU 614 may comprise any type of electronic data processor. The memory 608 may comprise any type of system memory such as static random access memory (SRAM), dynamic random access memory (DRAM), synchronous DRAM (SDRAM), read-only memory (ROM), a combination thereof, or the like. In an embodiment, the memory 608 may include ROM for use at boot-up, and DRAM for program and data storage for use while executing programs.

The mass storage 604 may comprise any type of storage device configured to store data, programs, and other information and to make the data, programs, and other information accessible via the bus 620. The mass storage 604 may comprise, for example, one or more of a solid state drive, hard disk drive, a magnetic disk drive, an optical disk drive, or the like.

The video adapter 610 and the I/O interface 612 provide interfaces to couple external input and output devices to the processing unit 602. As illustrated, examples of input and output devices include a display 618 coupled to the video adapter 610 and a mouse/keyboard/printer 616 coupled to the I/O interface 612. Other devices may be coupled to the processing unit 602, and additional or fewer interface cards may be utilized. For example, a serial interface such as Universal Serial Bus (USB) (not shown) may be used to provide an interface for a printer.

The processing unit 602 also includes one or more network interfaces 606, which may comprise wired links, such as an Ethernet cable or the like, and/or wireless links to access nodes or different networks. The network interfaces 606 allow the processing unit 602 to communicate with remote units via the networks. For example, the network interfaces 606 may provide wireless communication via one or more transmitters/transmit antennas and one or more receivers/receive antennas. In an embodiment, the processing unit 602 is coupled to a local-area network 622 or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of Ethernet packet routing in a layer-two transit network with multiprotocol label switching (MPLS) encapsulation, comprising:
   receiving a packet at a provider router for the layer-two transit network, wherein the packet has an MPLS label field and a layer-two header; and
   evaluating a time-to-live (TTL) attribute in the MPLS label field for loop detection by:
      recalculating the TTL attribute and writing the recalculated TTL attribute to the packet in response to the TLL attribute indicating that packet is not in a loop; and
      transmitting the packet including the recalculated TTL attribute using a network interface connected to the layer-two transit network and according to information in the layer-two header in response to the TTL attribute indicating that packet is not in the loop.

2. The method of claim 1 wherein the evaluating the TTL attribute comprises evaluating the TTL attribute further by dropping the packet in response to the TLL attribute indicating that packet is in the loop.

3. The method of claim 1 wherein the transmitting the packet includes at least one of:
   transmitting the packet to another provider router in the layer-two transit network according to a destination address (DA) and a virtual local area network identifier (VID) in the layer-two header; and
   transmitting the packet to another provider router in the layer-two transit network according to a backbone media access control (BMAC) address in the layer-two header.

4. The method of claim 1, further comprising storing the packet in a non-transitory memory by writing the MPLS label field in a memory block having an MPLS label portion, a quality of service (QoS) portion, a stack indicator portion, and a TTL portion.

5. The method of claim 1 wherein the TTL attribute indicates the loop when its value reaches a TTL end value.

6. The method of claim 1 wherein the recalculating the TTL attribute includes computing a new TTL value according to a linear function of a current value of the TTL attribute.

7. The method of claim 1 wherein the MPLS label field comprises at least one of an MPLS transit label field and an MPLS service label field, and wherein the writing the TTL attribute further comprises writing the TTL attribute to a non-transitory memory in the at least one of the MPLS transit label field and the MPLS service label field.

8. A provider router, comprising:
   a network interface controller (NIC) having a first port and a second port;
   a non-transitory memory configured to store a multiprotocol label switching (MPLS) encapsulated packet receivable through the first port, wherein the MPLS encapsulated packet comprises an MPLS label field and a layer-two header; and
   a processor coupled to the NIC and the non-transitory memory and configured to:
      evaluate a time-to-live (TTL) attribute stored in a memory block of the non-transitory memory corresponding to the MPLS label field for loop detection;
      drop the MPLS encapsulated packet when the TTL attribute in the non-transitory memory indicates a loop; and
      compute a new TTL value for the TTL attribute and cause the new TTL value to be written to the memory block corresponding to the MPLS label field when the TTL attribute in the non-transitory memory does not indicate the loop, and cause the NIC to transmit the MPLS encapsulated packet including the new TTL value through the second port according to information in the layer-two header.

9. The provider router of claim 8 wherein the MPLS label field comprises at least one of an MPLS transit label field and an MPLS service label field, and wherein the memory block of the non-transitory memory corresponds to the at least one of the MPLS transit label field and the MPLS service label field.

10. The provider router of claim 8 wherein the non-transitory memory is further configured to store the MPLS encapsulated packet according to a packet data structure having an MPLS transit label portion and an MPLS service label portion.

11. The provider router of claim 10 wherein the processor is further configured to:
   evaluate the TTL attribute stored in the MPLS transit label portion; and
   cause the new TTL value to be written to the MPLS transit label portion.

12. The provider router of claim 8 wherein the non-transitory memory is further configured to store the MPLS label field of the MPLS encapsulated packet according to an MPLS label data structure having an MPLS label portion, a quality of service (QoS) portion, a stack indicator portion and a TTL portion.

13. The provider router of claim 8 wherein the processor comprises an application specific integrated circuit (ASIC) coupled to the NIC and the non-transitory memory.

14. The provider router of claim 8 wherein the processor is further configured to instruct the NIC to transmit the MPLS encapsulated packet according to a backbone media access control (BMAC) address in the layer-two header stored in the non-transitory memory.

15. The provider router of claim 8 wherein the processor is further configured to compute the new TTL value according to a linear function of a current value of the TTL attribute.

16. The provider router of claim 8 wherein the processor is further configured to compare a current TTL value of the TTL attribute to an end TTL value to determine when to drop the MPLS encapsulated packet.

17. A router, comprising:
- a network interface controller (NIC);
- a non-transitory memory configured to store a multiprotocol label switching (MPLS) encapsulated packet receivable through the NIC, wherein the MPLS encapsulated packet comprises an MPLS label field and a layer-two header; and
- a processing circuit coupled to the NIC and the non-transitory memory, the processing circuit configured to:
  - evaluate, for loop detection, a time-to-live (TTL) attribute stored in a memory block of the non-transitory memory corresponding to the MPLS label field, wherein the TTL attribute is evaluated according to an end value;
  - compute, in response to the evaluation of the TTL attribute indicating that a loop is not detected, a new TTL value for the TTL attribute and cause the new TTL value to be written to the memory block corresponding to the MPLS label field; and
  - cause the NIC to transmit the MPLS encapsulated packet including the new TTL value through the NIC according to information in the layer-two header.

18. The router of claim 17, wherein the processing circuit is further configured to drop the MPLS encapsulated packet in response to the evaluation of the TTL attribute indicating that a loop is detected.

19. The router of claim 17, wherein the evaluation of the TTL attribute indicates that a loop is detected when the TTL attribute is equal to or less than the end value.

20. The router of claim 17, wherein the processing circuit is further configured compute the new TTL value according to a linear function of a current value of the TTL attribute.

* * * * *